US005745485A

United States Patent [19]
Abramson

[11] Patent Number: 5,745,485
[45] Date of Patent: Apr. 28, 1998

[54] DUAL CODE MULTIPLE ACCESS FOR WIRELESS DATA NETWORKS

[75] Inventor: Norman Abramson, San Francisco, Calif.

[73] Assignee: Aloha Networks, Inc., San Francisco, Calif.

[21] Appl. No.: 665,843

[22] Filed: Jun. 19, 1996

Related U.S. Application Data

[60] Provisional application No. 60/000,324, Jun. 19, 1995.
[51] Int. Cl.$^6$ ..................................................... H04J 13/00
[52] U.S. Cl. ............................ 370/342; 370/347; 375/205
[58] Field of Search ..................................... 370/342, 320, 370/324, 335, 441, 310, 314, 316, 319, 321, 326, 337, 341, 347, 350, 401, 461, 458, 479, 503, 497, 498, 407, 408, 465, 467, 468–469, 478; 375/200, 205; 455/3.2, 5.1, 422, 427, 428, 35.1; 340/825.02, 825.03

[56] References Cited

U.S. PATENT DOCUMENTS

| Re. 32,905 | 4/1989 | Baran | 370/104 |
|---|---|---|---|
| 4,455,651 | 6/1984 | Baran | 370/104 |
| 4,545,061 | 10/1985 | Hileman | 375/200 |
| 4,841,527 | 6/1989 | Raychaudhuri et al. | 371/32 |
| 5,084,900 | 1/1992 | Taylor | 370/18 |
| 5,136,612 | 8/1992 | Bi | 370/18 |
| 5,151,919 | 9/1992 | Dent | 375/200 |
| 5,218,619 | 6/1993 | Dent | 375/200 |
| 5,235,612 | 8/1993 | Stilwell et al. | 375/200 |
| 5,245,612 | 9/1993 | Kachi et al. | 370/104.1 |
| 5,305,348 | 4/1994 | Izumi | 375/200 |
| 5,377,225 | 12/1994 | Davis | 375/200 |
| 5,410,568 | 4/1995 | Schilling | 375/205 |
| 5,430,760 | 7/1995 | Dent | 375/200 |
| 5,430,761 | 7/1995 | Bruckert et al. | 375/200 |
| 5,537,397 | 7/1996 | Abramson | 370/441 |

OTHER PUBLICATIONS

Denise Meile, "Most Often Asked Questions About CDMA", Qualcomm Announcement (Aug. 23, 1991).
Price et al., "A Communication Technique for Multipath Channels", Proceeding of IRE, vol. 46, pp. 555–570 (Mar. 1958).
Lipke et al., "MARISAT–A Maritime Satellit Comm. System", COMSTAT Technical Review, vol. 7, No. 2, (Fall 1977).
Michael J. Arcus, "Regulatory Policy Considerations . . . ", IEEE Communications Magazine, vol. 25, No. 7, pp. 95–99 (Jul. 1987).

(List continued on next page.)

*Primary Examiner*—Dang Ton
*Attorney, Agent, or Firm*—James Creighton Wray; Meera P. Narasimhan

[57] ABSTRACT

A simplified process of signal detection in a multiple access data communications uses a small number of different spreading signals rather than a single spreading signal such as used in a Spread ALOHA multiple access network. The process selects a spreading signal which depends upon a property of the signal being transmitted rather than upon the transmitter which is transmitting the signal as in Code Division Multiple Access (CDMA). Multiple transmitters can use pilot signals and transmit the multiple data signal with the selected spreading sequences. The hub station receives the multiple data signals and detects the multiple data signals with matched filters or correlators matched to the code spreading sequences. Outputs of the matched filters or correlators can create control signals for offsetting the transmitted data signals by advancing or retarding timing of the transmitting of the multiple data signals from the multiple transmitters. The spreading signal for each transmitter may also depend upon whether the transmission is on the "in phase" channel or the "quadrature" channel, thus doubling the number of spreading codes used in the data network. The codes selected for spreading in such a dual code (or multiple code) Spread ALOHA network can be different "m-sequences" for each class of traffic.

23 Claims, 3 Drawing Sheets

OTHER PUBLICATIONS

Norman Abramson, "Development of the ALOHANET", IEEE Transactions . . . , vol. IT–31, No. 2, pp. 119–123 (Mar. 1985).

Norman Abramson, "Multiple Access in Wireless Digital Networks", Invited paper, Proceedings of the IEEE (Sep. 1994).

Norman Abramson, "Spread Aloha for VSAT Networks", ALOHA Sys. Tech. Report, Univ. of Hawaii (rev. Jan. 1987) (Jun. 1986).

"CDMA Wireless Communications", commerical brochure (Apr. 30, 1993).

R.A. Scholtz, "Multiple Access with Time–Hopping Impulse Modulation", Comm. Sc. Inst., Univ. of S. California, Los Angeles, CA.

Raymond Steele, "Speech Codecs for Personal Communications", IEEE Communications Magainze, pp. 76–83 (Nov. 1993).

Ewerbring et al., "CDMA–IC: A Proposal for Future High Capacity . . . ", Proceedings of 1993 IEEE Vehic. Tech. Conf., pp. 440–443.

Richard Kerr, "CDMA Digital Cellular", Applied Microwave & Wireless, pp. 30–41 (Fall 1993).

Norman Abramson, "Fundamentals on Packet Multiple Access . . . ", IEEE Journal on Selected Areas of Comm., vol. 10, No. 2 (Feb. 1992).

Norman Abramson, "VSAT DAta Neworks", Proceedings of IEEE, Special Issue on Satellite Comm., vol. 78, No. 7, pp. 1267–1274 (Jul. 1990).

Viterbi et al., "Erlang Capacity of a Power Controlled CDMA System", Qualcomm Inc., (Feb. 11, 1993).

Norman Abramson, "Multiple Access Communications: Foundations for Emerging Technologies", IEEE Press (1993).

DUAL CODE MULTIPLE ACCESS FOR WIRELESS DATA NETWORKS

BACKGROUND OF THE INVENTION

This application claims the benefit of U.S. Provisional Application No. 60/000,324, filed Jun. 19, 1995.

The "code division" in code division multiple access, CDMA, refers to the fact that in the prior art all of the CDMA channels rely on the use of a different binary code by each transmitter in a network to separate signals from different transmitters at the hub receiver. See for example Norman Abramson, Multiple Access Communications: Foundations for Emerging Technologies, (editor) IEEE Press, 1993. In the prior art the general understanding that multiple codes and code division are required for the effective operation of a CDMA channel is explicitly contained in many CDMA patents. See for example U.S. Pat. No. 4,455,651 (Baran), U.S. Pat. No. 4,841,527 (Raychaudhuri et al.), U.S. Pat. No. 5,136,612 (Bi), U.S. Pat. No. 5,151,919 (Dent), U.S. Pat. No. 5,218,619 (Dent), U.S. Pat. No. 5,235,612 (Stillwell et al.), and U.S. Pat. No. 5,305,348 (Izumi).

The use of multiple codes (one for each transmitter) in CDMA systems today results in major complications in the design of such systems. The complications flow from the fact that since each user in these systems has a separate code and since the code is used to separate one user from another, the hub station in a CDMA network must contain a different receiver for each user code in the network. Thus the hub stations are unreasonably complicated, and CDMA systems have in general been the subject of much criticism because of this complication. Furthermore many functions of a CDMA system are made more complex, and many subsidiary functions which could otherwise be used in the system are precluded because of the fact that the hub receiver does not know the code which is used in each signal being received.

Figure 2:
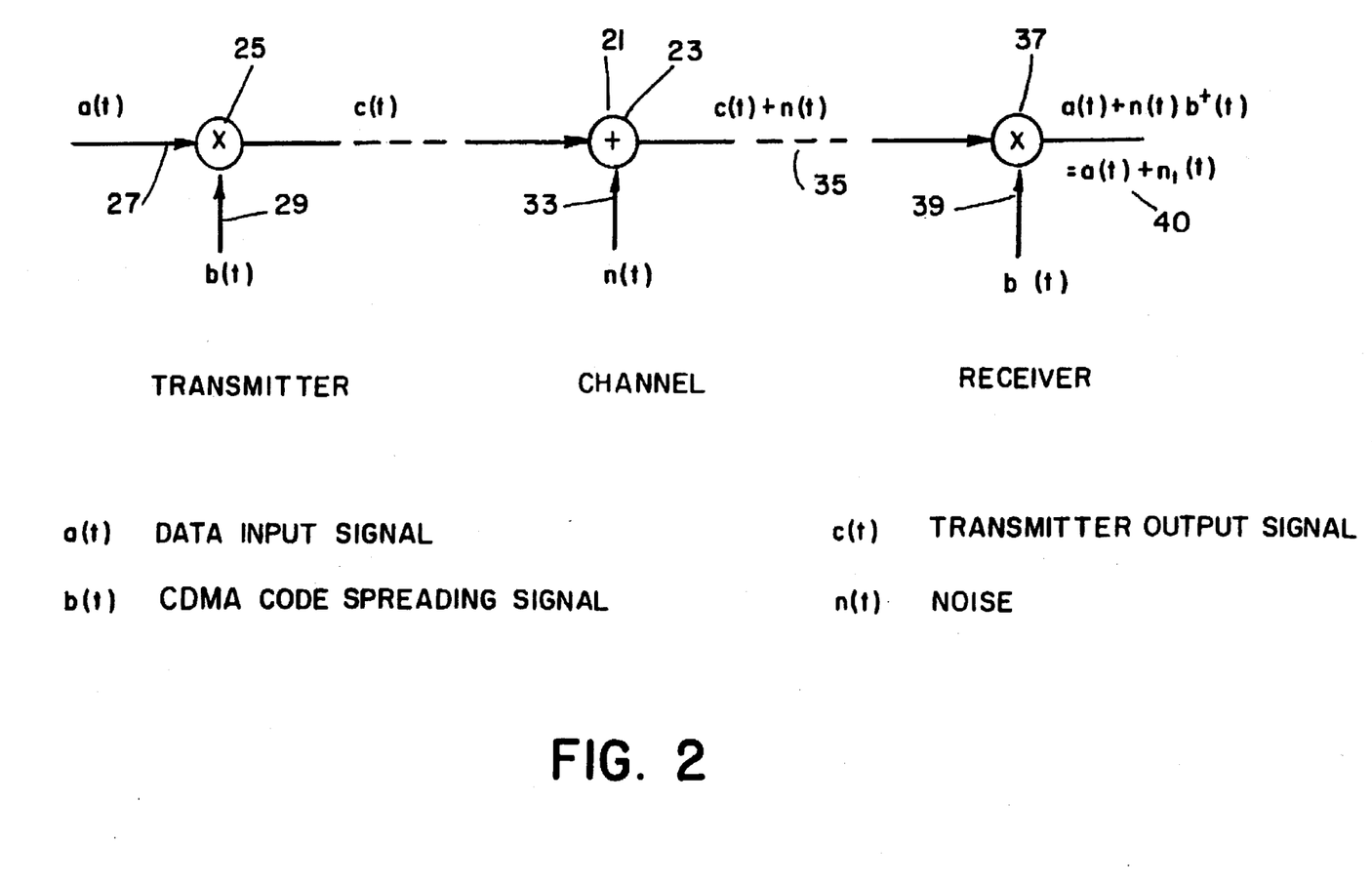
FIG. 2 schematically represents a single user transmission in a CDMA channel.

The transmission of a signal from a single user in a multiple access CDMA channel can be described in terms of a complex signal representation as shown in FIG. 2. The general signal modulation process is represented as the multiplication of the data input signal $a(t)$ by a modulated carrier, $b(t)$. The resulting transmitted signal is:

$$c(t)=a(t)b(t) \qquad (1)$$

If it is required that $b(t)$ the modulated carrier for this user satisfies:

$$|b(t)|^2=1 \qquad (2)$$

then the fundamental operation of a receiver is to multiply the received signal plus noise, $c(t)+n(t)$, by the complex conjugate of the modulated carrier, $b^*(t)$, in order to recover the original information in $a(t)$.

$$[c(t)+n(t)]b^*(t)=a(t)+n(t)b^*(t) \qquad (3)$$

This representation is general enough to include conventional forms of modulation, when $b(t)$ is a narrowband carrier. But in the case of CDMA, the modulating carrier, $b(t)$, is a different wideband carrier for each possible terminal in the network. This multiplicity of possible transmitter carriers is reflected in a multiplicity of receivers required at a CDMA base station in order to demodulate the received signal. Clearly if the total number of potential data terminals in the network is much larger than the number of terminals active at any given time this requirement can introduce considerable complexity into the design of a CDMA multiple access system.

The two significant commercial CDMA data networks which have been built so far (one by Equatorial Communications, Inc. and one by Qualcomm, Inc.) have addressed this problem of different carriers used by different terminals in a CDMA system in two distinct ways.

In the Equatorial Communications CDMA satellite network composed of large numbers of C-200 micro earth terminals, each terminal was assigned a deterministic CDMA code spreading sequence to form a different wideband carrier, $b(t)$. In order to demodulate a user at the hub station then, it was necessary to install a separate card, called an "ear card", matched to each different spreading sequence, for each user authorized to transmit in the system. With the set of users changing on a daily basis, it was therefore necessary to insert and remove cards at the base station in order to keep current with the existing customer set. The maintenance logistics of such a design for a large network are not easy.

The Qualcomm CDMA system provides an ambitious network design for use by voice traffic in a cellular based telephone system. This design has been adopted as the IS-95 standard by the US Telecommunication Industry Association. In the Qualcomm design the problem of multiple carriers at the terminals and multiple receivers at the base station is handled by software rather than hardware as in the Equatorial system. The process begins by a remote terminal requesting access to the network. Since the terminals do not have a permanently assigned coding sequence, this request is sent via a separate ALOHA channel within the Qualcomm CDMA protocol.

After the ALOHA call request is received at the base station the terminal is assigned a spreading sequence and other setup parameters. These are transmitted to the requesting terminal by means of the broadcast channel from the base station. The spreading sequence is loaded into the terminal and a separate receiver matched to the assigned spreading sequence is assigned at the base station. In the present generation of the Qualcomm design a maximum of 64 such receivers can be assigned.

The Qualcomm CDMA design eliminates the logistical problems associated with installing a separate "ear card" for each different spreading sequence as in the Equatorial Communications CDMA design. But in order to provide a different spreading sequence to each user in a dynamically changing user set, the Qualcomm system must provide a separate ALOHA request channel. In this respect the Qualcomm design is similar to a demand assigned multiple access (DAMA) system. As in any DAMA system the request channel introduces a delay and an overhead in the call setup process.

For a network serving only voice traffic it does not appear that this overhead and delay is a serious problem. But in a network which includes a significant amount of transaction traffic, or other digital traffic with less regularity than voice traffic, both the overhead and the delay could limit the network flexibility and the ability of the network to adapt to a more general traffic mix.

Because of the dynamic assignment of different spreading sequences, the Qualcomm base station does not require a separate receiver for each spreading sequence in the network, but it does require a separate receiver for each spreading sequence active in the network. In the present Qualcomm design the maximum number of such receivers in a single cell is fixed at 64. In principle this number could be increased, but the requirement that a separate receiver be used for each different CDMA spreading sequence is a fundamental limitation on both the simplicity and the flexibility of CDMA operation.

In an ALOHA multiple access channel packets are buffered at each terminal and transmitted over a common channel to the hub. No control is imposed on the channel in order to synchronize transmissions from the various users, and therefore the start times of packets from different users in the network can be modeled as a Poisson point process. Under these circumstances packets from different users will be transmitted with a high probability of success if there is a moderate amount of traffic on the network. As the traffic on the network increases the probability of a collision between packets from different users increases. The pessimistic assumption that a collision results in the loss of two packets is usually made in the analysis of an ALOHA channel.

Using this assumption a relation can be derived between the total traffic on the network and the throughput of the network. If G is the total traffic expressed as a fraction of the maximum possible data rate and S is the channel throughput expressed as the same fraction, then the throughput will vary as a function of the offered traffic.

Figure 3:
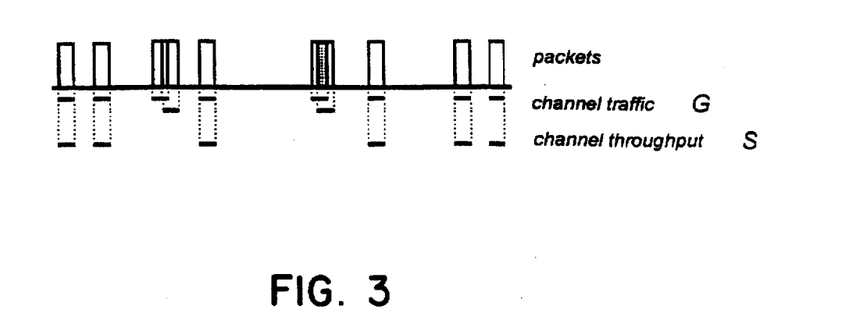
FIG. 3 schematically compares ALOHA channel throughput with channel traffic when transmission packets coincide.

FIG. 3 shows a definition of the ALOHA Traffic (G) and Throughput (S).

Figure 4:
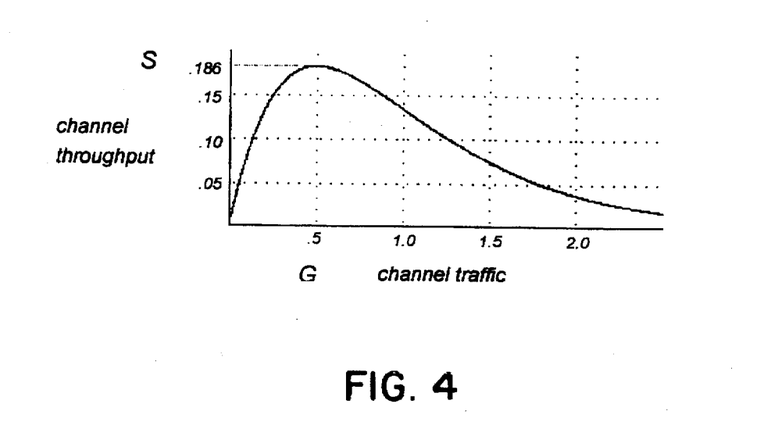
FIG. 4 graphically compares ALOHA channel throughput as a function of channel traffic.

The relationship between the throughput, S, and the traffic, G, is given by:

$$S = Ge^{-2G} \quad (4)$$

That relationship is shown in FIG. 4, which charts ALOHA Throughput (S) vs. Traffic (G).

In FIG. 4 the ALOHA throughput reaches a maximum value of 0.186 when the value of the traffic is 0.5.

Conventional ALOHA channels are most effective for the transmission of data from large numbers of independent terminals to a hub, where the data rate from any single terminal is much less than the total capacity of the shared digital channel. ALOHA multiple access architecture has typically been employed in channels of moderate bandwidth, comparable to that of a single digital voice channel.

There is no theoretical reason why the ALOHA architecture will not work as well in a high bandwidth channel corresponding to the bandwidth used in a spread spectrum system. The Ethernet local area network CSMA/CD standard based upon an ALOHA channel is an example of a 10 Mbs network using this technology. For the case of a wireless channel however, the peak power requirements of the transmitter required to achieve a useful value of energy per bit, $E_b$, can restrict the usefulness of a conventional ALOHA multiple access channel in a high bandwidth situation.

SUMMARY OF THE INVENTION

In the present invention each of multiple transmitters uses a code spreading sequence which depends upon the type of traffic the transmitter intends to transmit in the Spread Aloha multiple access wireless data network.

The code spreading sequence is selected according to the type of data being transmitted, for example transactions, digital voice or files. Transactions include, as examples, point of sale, credit card uses, responses from keyboards, e-mail and other uses which provides lines of data, often widely spaced. Examples of files include video, graphics, faxes and other sustained data transmissions.

The invention may also be used to separate different kinds of traffic by selecting a spreading code according to the nature of the transmission. Some transmissions are chip synchronous; some are asynchronous. A different spreading code may be assigned to each of these two kinds of transmission.

An additional application of this invention is to assign two different spreading codes, one for the "in phase" and one for the "quadrature" components of the transmitted signal. Such an assignment of spreading codes could be of value in the detection of asynchronous transmissions from different transmitters.

In addition it is possible to assign different spreading codes for different types of traffic and within each type to use one spreading code for the "in phase" component of the signal and another for the "quadrature" component of the signal. Such an assignment of spreading codes would double the number of codes required when compared to a system using the same code for both "in phase" and "quadrature" signal components, but such an assignment could have a value in the detection of asynchronous transmissions from different transmitters. It is emphasized, however, that in all cases of this invention codes are used to differentiate different classes of transmissions, not different transmitters, as is the usual state of the art in conventional CDMA. Since the number of classes of transmissions is known in the network (while the number of possible transmitters can be unknown), and since the number of such classes can be much less than the number of different transmitters, this difference can greatly simplify the design of the hub station receiver.

The new invention may be used as an overlay to handle files and transactions for digitized voice cellular systems using either TDMA (such as GSM or IS-54) or CDMA (such as I-95). The new system beneficially affects the cost and the efficiency of cellular resources.

The present invention provides different spreading codes for digitized voice and data and not different codes for different transmitters. A single code or two codes would handle all data, while another code or other codes would handle voice or voice would be handled by any of the standard cellular techniques (such as I-95).

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
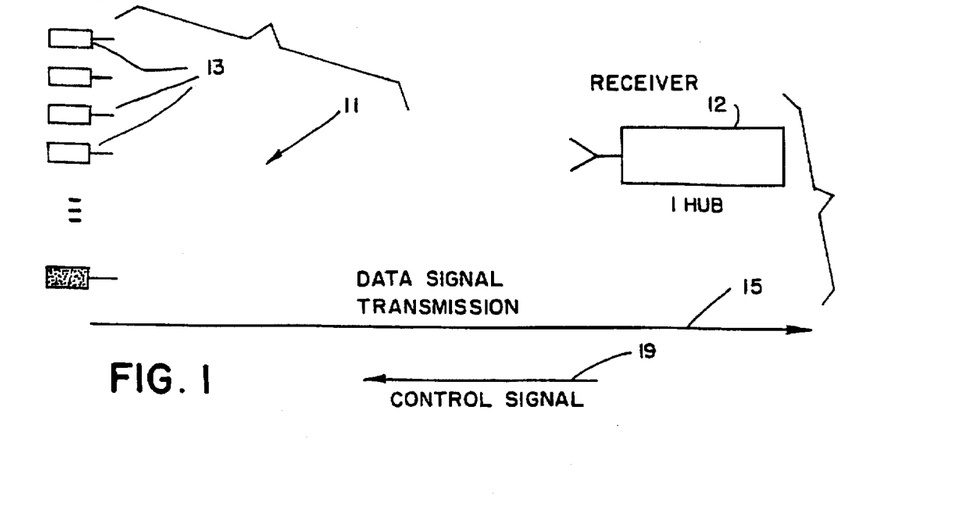
FIG. 1 is a schematic representation of a multiple access data channel.

This invention applies to a multiple access wireless data network or satellite data network or to any other kind of multiple access (many to one) data network. A general multiple access data network of the sort dealt with in this patent application is shown in FIG. 1.

The specific focus of this invention is an enhanced form of Spread ALOHA multiple access which can provide greatly improved performance in the presence of long files or digital voice traffic. Spread ALOHA is described in allowed co-pending application Ser. No. 08/255,720 filed Jun. 7, 1994 now U.S. Pat. No. 5,537,397 for which the issue fee was paid Mar. 26, 1996, the disclosure of which is incorporated herein by reference. Spread ALOHA is a new form of multiple access which combines the simplicity of conventional ALOHA multiple access communications with the high bandwidth of spread spectrum communications. It is also possible to view the subject of this invention as a simplified form of CDMA.

When all transmitters use the same signal or a small number of signals many more options for the design of the system become available.

Spread ALOHA provides a multiple access option which combines the proven simplicity and operational flexibility of an ALOHA multiple access channel with the high bandwidth and high throughput of a spread spectrum CDMA channel. Spread ALOHA can be thought of as a simplified form of CDMA with only a single common spreading code assigned to all users. Transmissions from different users in a Spread ALOHA channel are separated by means of an ALOHA random timing mechanism rather than by code division. When the code division is eliminated the need for a separate receiver for each possible transmitter at the hub station is also eliminated and the primary roadblock to the implementation of a high bandwidth multiple access channel is eliminated.

Figure 5:
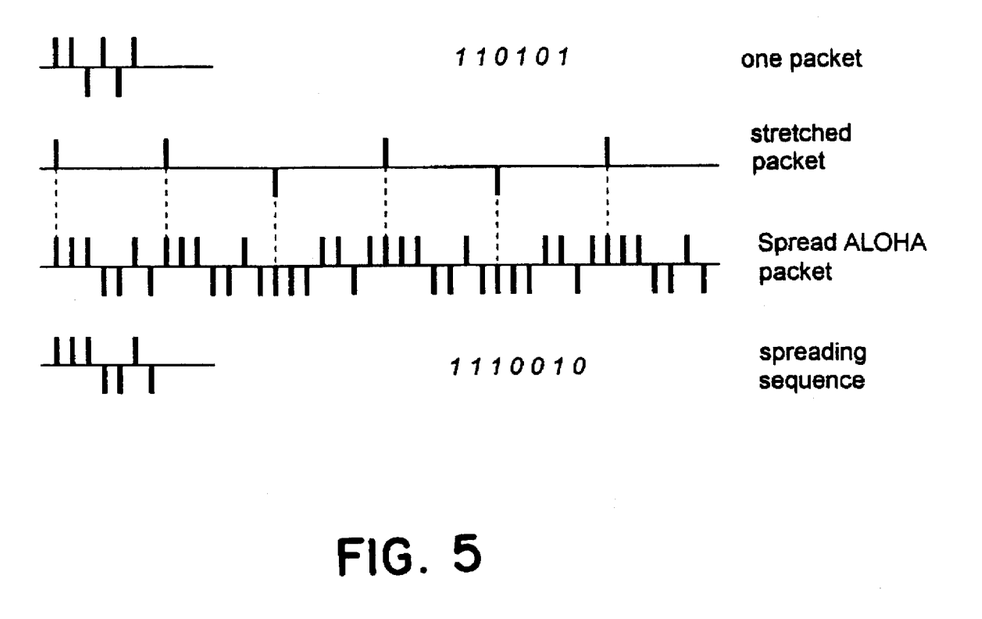
FIG. 5 schematically demonstrates using Spread ALOHA.

In order to provide an ALOHA multiple access capability with the high bandwidth of a CDMA channel, high bandwidth ALOHA packets are spread in time to decrease the burst power requirements on the remote transmitters. There are several ways to achieve the required time spreading, but perhaps the simplest is illustrated (for the case of a packet composed of only 6 bits, using a spreading sequence of 7 bits) in FIG. 5. FIG. 5 shows how to Spread ALOHA.

If the peak power of the Spread ALOHA transmitter is decreased by the spreading gain, Spread ALOHA will use the same average power as conventional ALOHA. However it might appear that the increased packet length of Spread ALOHA results in many more packet collisions in the channel and therefore a greatly decreased channel throughput as given in equation (4) and FIG. 4. Although it is true that the Spread ALOHA process described will result in a larger number of packet overlaps in the multiple access channel, it is not true that these overlaps will result in an overall lower value of packet throughput as would be the case in a narrowband ALOHA channel.

The reason for this difference in the Spread ALOHA channel can be seen by considering the process of signal detection in a wideband channel. In a conventional narrowband ALOHA channel where the Nyquist rate and the bit rate are roughly equal it is reasonable to assume that two packets which overlap in time in the channel will both be lost. For the case of a wideband channel such as used in Spread ALOHA however, two packets from different transmitters which overlap in the channel may still be received correctly if the packets do not overlap at the output of the hub receiver. This distinction will be significant when the hub receiver can compress the packets received from different transmitters in the multiple access channel.

This kind of compression can take place when the number of Nyquist samples per bit in the packet is large; that is, in the case of a CDMA packet or the case of a Spread ALOHA packet. The compression which occurs can be interpreted as a form of packet capture.

Conventional ALOHA channels can be used to integrate file traffic, digital voice traffic and transaction traffic on the same channel. Since conventional ALOHA in wireless networks is limited to a few tens of kilobits per second, the ability of the network to handle large files and significant numbers of voice users is severely constrained.

From the point of view of the network user Spread ALOHA can be viewed as simply a much higher speed version of conventional ALOHA multiple access. The scale of the data rate in a Spread ALOHA channel can be consistent with the ability to handle large files, significant numbers of voice users and extremely large numbers of transaction users. Spread ALOHA is a two channel system with the ability to transmit data in the broadcast channel from the hub to the terminals as well as in the multiple access channel from the terminals to the hub.

In a single code Spread ALOHA system all data packets are received at the output of the same matched filter receiver. Timing of the transmissions from each user in a Spread ALOHA channel can be adjusted using feedback from the broadcast channel in the network so that the transmissions from each user are chip synchronous whenever feasible. That is, the sampled output of the hub matched filter at the chip times provide the key information which allows the hub receiver to effectively and efficiently separate the transmissions from different users in the system.

Certain packet transmissions however will not be chip synchronous. The initial transmission from a unit when it powers up cannot be chip synchronous since the feedback information from the hub station is provided only in response to the initial power up packet. In addition there is a maximum amount of time between successive packet transmissions from one terminal which is consistent with chip synchronous transmissions from terminals to the hub in the Spread ALOHA multiple access channel. This interval can be increased by the use of accurate clocks in the terminals, but it is important to keep the cost of each terminal low, since there may be many terminals for each hub station in a Spread ALOHA network.

The extension of the Spread ALOHA protocol described in this invention employs two or some other small number of separate spreading codes rather than a single code. One code can be used for all the chip synchronous traffic, including reservation traffic, and another code is used for packets which may not be chip synchronous.

Alternatively one spreading code can be used for one class of traffic and other codes can be used for other classes of traffic. Alternatively one code can be used for "in phase" components of the transmitted signal and another code can be used for "quadrature" components of the transmitted signal. In addition we may double the number of spreading codes employed by assigning one spreading code to the "in phase" component of each class of traffic and another spreading code to the "quadrature" component of each class of traffic. In each case a transmitter selects a spreading code depending upon the class of traffic (or chip synchronous or asynchronous property) and depending upon whether the code will be used in the "in phase" or "quadrature" channel. The key difference between the present invention and the prior art is that the code selected to spread the signal depends upon a property of the transmitted signal rather than upon the particular transmitter used. Since the number of different signal properties including "in phase" and "quadrature" channels can be much smaller than the number of different transmitters in a network, this can be a major advantage in the design of a multiple access network.

The addition of a known second spreading code to both the hub unit and the terminal units is not a major complication, and in the presence of certain kinds of traffic separating the packets into chip synchronous and chip asynchronous traffic can increase the throughput by a large factor. This enhancement is called DC (Dual Code) or MC (Multiple Code) Spread ALOHA. The relationship of DC Spread ALOHA to ALOHA and Spread ALOHA is depicted in FIG. 6.

Figure 6:
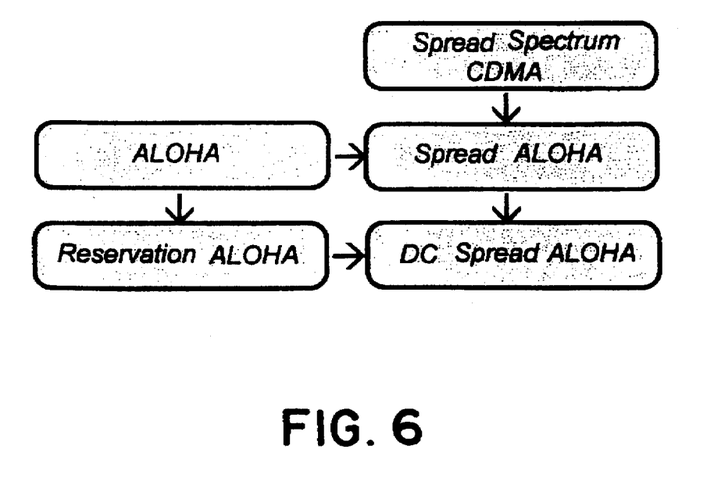
FIG. 6 shows relationships among certain Multiple Access protocols.

FIG. 6 shows relationships among certain multiple access protocols.

DC Spread ALOHA provides the capability of reservations for long files analogous to various conventional ALOHA reservation protocols which have been proposed. Perhaps most significantly DC Spread ALOHA can provide the confirmed reservations required to transmit digitized compressed voice signals within a Spread ALOHA network. This latter capability was not feasible in conventional ALOHA networks even with a reservation capability since the burst data rate of conventional ALOHA is not consistent with the requirements of several voice channels.

The use of various reservation techniques to increase the throughput of a conventional ALOHA channel was first shortly after the first ALOHA channel was put into operation in the ALOHANET. In some proposed reservation protocols the ALOHA channel was used to make reservations in a separate channel. This kind of reservation ALOHA algorithm has been implemented in the Inmarsat satellite network and in the IS-95 CDMA cellular standard. In other protocols a frame structure was imposed on the ALOHA channel, and a portion of the frame was reserved for file traffic. Reservations for the file portion of the frame were made by transaction packets which shared the remainder of the frame with other transaction traffic. This kind of ALOHA reservation has been implemented in the patented ARIA Wireless Systems Collision Eliminating Multiple Access (CEMA) networks.

In both the separate channel and in the framed reservation protocols a certain amount of inflexibility is imposed by the low data rate of the conventional ALOHA channel. In the separate channel systems some fixed number of conventional point to point channels are set aide and assigned in response to reservations made through the random access ALOHA channel. This approach leads to inefficiencies both because of the fixed number of point to point channels in the system and because each of the channels may not be used at a high value of throughput even when it is assigned. Furthermore the use of multiple channels implies an added cost for multiple transmitters and receivers in the user terminals. In networks with large numbers of terminals this added terminal cost is a major disadvantage.

In the framed reservation systems, since the overall channel data rate is constrained by the data rate of the ALOHA channel either the number of transmitters in the network must be small or the data rate of the individual user is small. There is simply not enough capacity in a single conventional ALOHA channel for significant file or voice traffic. Furthermore the division of the frame can add either inflexibility or complexity or both to the overall system design.

The Spread ALOHA channel takes advantage of the high data rate of the channel to provide both transaction traffic and reservation (file or voice) traffic within the same channel. In this respect DC Spread ALOHA is similar to ALOHA low data rate framed reservation systems. But with the improved data rates of Spread ALOHA the scale of the reservation traffic is consistent with file transfer and voice applications of interest in the market today. Furthermore, since separate RF channels for reservation traffic are not required, the cost of the user terminal for a DC Spread ALOHA network is comparable to that of a Spread ALOHA terminal designed for transaction traffic only.

In the DC Spread ALOHA network user traffic can be separated according to whether it is chip synchronous or chip asynchronous. The same two spreading codes will be utilized by all transmitters in the multiple access channel, one for chip synchronous and one for chip asynchronous traffic. In this way, if there is no reservation traffic on the network, there is no impact on the transaction traffic carried by the spreading code for asynchronous traffic. Since much or even all the traffic using the spreading code for synchronous packets can be assigned by the hub station, this traffic can flow in the channel with few if any collisions from chip synchronous packets. Of course interference from chip asynchronous packets using the other code will still be present, but in many cases almost all the traffic will share the spreading code for the chip synchronous packets. The efficiency of this kind of protocol when the traffic is composed of files and voice traffic can approach one.

When a user terminal in a DC Spread ALOHA multiple access channel is switched on, a power up packet is automatically transmitted to the hub station using the spreading code reserved for chip asynchronous traffic. Once that packet is received at the hub station the hub station sends back timing information to the remote terminal. From that point on the transmissions from the terminal to the hub can be transmitted using either of the two codes. The choice of code will depend upon channel loading and the characteristics of the channel traffic. For example it may be desirable to restrict the use of the chip synchronous code to file and packet voice traffic and to require that the chip synchronous code be authorized by the hub station before use. Under certain kinds of traffic it may be desirable to allow transaction traffic to access the chip synchronous spreading code without reservations.

DC Spread ALOHA uses the same method of separation as conventional CDMA. However in DC Spread ALOHA there are only two (or some small number, MC Spread ALOHA) of different codes rather than a different code for each transmitter in the multiple access channel. Therefore it is not necessary for the hub station to implement a separate receiver for each potential user of the system as is the case in conventional CDMA. It is merely necessary for the hub receiver to implement two (or some small number) of receivers. The advantage of DC Spread ALOHA over a single code multiple access system is that the second code allows the system to separate the multiple access packets according to some desired criterion (such as whether a packet is synchronous at the chip level). This simplifies the problem of integrating voice, file and data traffic on a single flexible network.

It is also possible to extend the method described here to include traffic employing more than two separate spreading codes in a Spread ALOHA system. In this respect dual code Spread ALOHA is a step back from Spread ALOHA toward a CDMA multiple access system. But the key difference here is that in the prior art of CDMA multiple access it is necessary to assign a separate code to each separate transmitter in the network in order to separate transmissions from the different transmitters. The invention described here used separate codes to separate different kinds of traffic within the network. Thus a given transmitter may employ different codes during the transmission of packets with different types of traffic. And different transmitters may employ the same spreading code when they transmit packets from the same type of traffic. In a network with tens of thousands of transmitters the distinction is between a network using tens of thousands of codes and requiring tens of thousands of receivers at the hub station (CDMA) and a network using only 2 (or some small number of) codes and requiring only 2 (or some small number of) receivers at the hub station (DC Spread ALOHA or MC Spread ALOHA).

While the invention has been described with reference to specific embodiments, modifications and variations of the invention may be constructed without departing from the scope of the invention, which is defined in the following claims.

I claim:

1. A method of providing multiple access to a data communications channel, comprising forming multiple data signals with a first identical code spreading sequence and a second code spreading sequence in multiple transmitters, transmitting the multiple data signals from the multiple transmitters, detecting the multiple signals with matched filters or correlator or a multiplicity of matched filters or correlators matched to the first and second code spreading sequences in a hub station, using an output of the matched filters in the hub station for respectively offsetting the transmitted data signals by retarding and advancing some of the transmitted data signals, and transmitting control signals from the hub station to the transmitters for respectively advancing or retarding timing of some of the multiple transmitters for offsetting the transmitted data signals from the transmitters using the first or second identical code spreading sequence for receiving at the hub station data signals offset from each other.

2. The method of claim 1, further comprising selecting the code spreading sequences according to different kinds of multiple data signals traffic.

3. The method of claim 1, wherein the transmitting comprises transmitting multiple signals on a channel medium.

4. The method of claim 1, further comprising selecting two codes rather than one code for each kind of data signal.

5. A method of simplifying a process of signal detection in a multiple access data communications channel, comprising broadcasting first and second pilot signals from a hub station, selecting between first and second code spreading sequences according to data traffic, controlling multiple data signals using the first or second code spreading sequence from multiple transmitters with the pilot signals, transmitting the multiple data signals and selected spreading sequences from the multiple transmitters, receiving the multiple data signals at the hub station, detecting the multiple data signals with matched filters or correlators matched to the code spreading sequences at the hub station, using an output of the matched filters or correlators matched to the code spreading sequences in the hub station for creating control signals for offsetting the transmitted data signals by advancing or retarding timing of the transmitting of the multiple data signals from the multiple transmitters, broadcasting the control signals to the multiple transmitters, and receiving the offset transmitted data signals using identical code spreading sequences from the transmitters at the hub station with the data signals offset from each other by a different number of chip times, thus decreasing the interference of signals from different transmitters with each other.

6. The method of claim 5, further comprising selecting two codes rather than one code according to the data traffic and using a pair of codes rather than just one code for spreading the transmitted signal.

7. The method of claim 5, further comprising subtracting successive signals from the received signals for allowing easier detecting of other signals contained in the received signals, reconstructing an interference pattern and subtracting the pattern at the output of a matched filter or correlator matched to a single code spreading sequence, and detecting the multiple signals in a single multiple access channel in the presence of mutual signal interference.

8. A method of providing multiple access to a data communications channel, comprising selecting a code spreading sequence from multiple code spreading sequences according to a type of transaction, digital voice or files in multiple data signals, using multiple code spreading sequences in creating multiple signals in each of multiple transmitters, transmitting the multiple signals from the multiple transmitters in a multiple access channel, receiving the multiple signals at a hub station, and detecting the multiple signals by using matched filters or correlators matched to the code spreading sequence in the hub station, subtracting successive signals in the multiple access channel from the received signals for allowing easier detecting of other signals contained in the received signals, and detecting the multiple signals in the multiple access channel in the presence of mutual interference.

9. The method of claim 8, further comprising selecting the multiple code spreading sequence for all of the transmitters from a specific class of maximum length shift register (MLSR) sequence or m-sequence codes in a length equal to $2^n-1$ for integer values of n, and producing reduced interference as compared with interference produced using a code selected at random.

10. The method of claim 8, wherein the subtracting further comprises determining a strongest or earliest signal to arrive at the hub station and then subtracting the first signal from the multiple signals at an output of a matched filter or correlator matched to a single code spreading sequence, examining remaining signals after subtracting the first signal, detecting a next signal, subtracting the next signal, and repeating the determining, subtracting and detecting as long as a new remaining signal is picked out of the multiple access channel, where each of the separate signals in the multiple access channel is spread by one of the multiple code spreading sequences according to the data signal type.

11. The method of claim 8, wherein the transmitting comprises transmitting multiple signals on a channel medium.

12. The method of claim 8, further comprising selecting two codes rather than one code for each kind of data signal.

13. A method of providing a multiple access data communications channel, comprising selecting according to traffic one of plural common code spreading sequences for all transmitters from a specific class of maximum length shift register (MLSR) sequence or m-sequence codes in a length equal to $2^n-1$ for integer values of n, using the selected code spreading sequences in multiple transmitters creating multiple data signals with identical code spreading sequences in the multiple transmitters, transmitting the multiple data signals from the multiple transmitters, detecting the multiple data signals with matched filters or correlators matched to single code spreading sequences in a hub station, using signals at a matched filter or correlator matched to a single code spreading sequence in the hub station for separating the multiple data signals, and producing reduced mutual signal interference as compared with mutual signal interference produced by selecting a code in a random or pseudorandom manner.

14. The method of claim 13, further comprising selecting two codes rather than one code for each kind of data signal.

15. The method of claim 13, wherein the transmitting comprises transmitting multiple signals on a channel medium.

16. The method of claim 2, wherein the multiple data signals are selected from a group comprising transactions, digital voice and files.

17. The method of claim 3, wherein the channel medium is selected from a group comprising packet radio channels, microwave channels, fiber optic channels, satellite channels, cellular systems, cables and wires.

18. The method of claim 4, wherein the data signal comprises an in-phase portion and a quadrature portion, and further comprising applying one of the two codes selected for the in-phase portion and another of the two codes for the quadrature portion.

19. The method of claim 6, wherein the data signal comprises an in-phase portion and a quadrature portion, and further comprising applying one of the two codes selected for the in-phase portion and another of the two codes for the quadrature portion.

20. The method of claim 11, wherein the channel medium is selected from a group comprising packet radio channels, microwave channels, fiber optic channels, satellite channels, cellular systems, cables and wires.

21. The method of claim 12, wherein the data signal comprises an in-phase portion and a quadrature portion, and further comprising applying one of the two codes selected for the in-phase portion and another of the two codes for the quadrature portion.

22. The method of claim 14, wherein the data signal comprises an in-phase portion and a quadrature portion, and further comprising applying one of the two codes selected for the in-phase portion and another of the two codes for the quadrature portion.

23. The method of claim 15, wherein the channel medium is selected from a group comprising packet radio channels, microwave channels, fiber optic channels, satellite channels, cellular systems, cables and wires.

* * * * *